(12) United States Patent
Curry

(10) Patent No.: US 6,415,740 B1
(45) Date of Patent: Jul. 9, 2002

(54) METHOD AND APPARATUS FOR REDUCING RISK THAT A THROWN TOY WILL INJURE AN ANIMAL

(76) Inventor: Jon K. Curry, P.O. Box 10601, Prescott, AZ (US) 86304

( * ) Notice: Subject to any disclaimer, the term of this patent is extended or adjusted under 35 U.S.C. 154(b) by 0 days.

(21) Appl. No.: 09/648,287

(22) Filed: Aug. 25, 2000

(51) Int. Cl.[7] .............................................. A01K 29/00
(52) U.S. Cl. ...................................... 119/707; 119/709
(58) Field of Search ................................ 119/702, 707, 119/708, 709

(56) References Cited

U.S. PATENT DOCUMENTS

| | | | | |
|---|---|---|---|---|
| 4,770,123 A | * | 9/1988 | Bell | 119/709 |
| 5,560,320 A | * | 10/1996 | Plunk | 119/709 |
| 5,619,954 A | * | 4/1997 | Rotondi | 119/709 |
| 5,865,146 A | * | 2/1999 | Markham | 119/707 |
| 6,112,703 A | * | 9/2000 | Handelsman | 119/707 |
| 6,116,191 A | * | 9/2000 | Suchowski et al. | 119/707 |

* cited by examiner

Primary Examiner—Charles T. Jordan
Assistant Examiner—Elizabeth Shaw
(74) Attorney, Agent, or Firm—Tod R. Nissle, P.C.

(57) ABSTRACT

A method and apparatus for reducing the risk that a thrown toy will injure an animal. The apparatus consists of a toy which when thrown bounces erratically, which compressively elastically deforms, which includes a soft fabric outer surface that compresses to absorb blows, and which can withstand being bitten or chewed by a dog.

2 Claims, 7 Drawing Sheets

METHOD AND APPARATUS FOR REDUCING RISK THAT A THROWN TOY WILL INJURE AN ANIMAL

This invention relates to toys.

More particularly, the invention relates to a toy for an animal.

In a further respect, the invention relates to an animal toy which when thrown can bounce erratically, which minimizes the probability of harm to an animal trying to catch a toy which has been thrown, which is symmetrical but is shaped to include points at varying distances away from the center of the toy to enable the toy to bounce erratically, which is permanently sealed so that the toy repeatedly compressively elastically deforms and bends in the same predictable manner, which includes a soft fabric outer surface that compresses to absorb blows and soften the impact when the toy hits an animal or other surface, and which can withstand being bitten or chewed by a dog and continue to function.

A wide variety of animal toys are known. One kind of toy is made of hard rubber and comes in a variety of shapes. For example, a dog bone made of hard, tough rubber has long been sold in retail outlets. A hard, tough rubber is utilized to make it difficult for a dog to chew through the bone. The rubber also adds weight to the toy, permitting the toy to be thrown long distances. Finally, the rubber material used to make the toy also enables the toy bone to bounce into the air. Dogs like chasing bouncing toys. While this type of toy is without question resistant to be damaged or chewed up, the toy is also dangerous. If the toy when thrown bounces into a dog, the toy can, due to its hardness, injure the animal. Worse, if the bone is thrown in the air and hits the dog straight away before the bone hits the ground, the dog can also be injured.

Animal toys can be constructed by attaching sections of felt fabric to the outer surface of a rubber shell such that the fabric sections are separated by a seam or strip of rubber or other polymer. In practice, the fabric sections are adhered or otherwise fastened to the rubber shell such that the edge of one piece of fabric is adjacent the edge of a second piece of fabric. The adjacent fabric edges define a rough seam line. A strip of rubber tape is attached to the pieces of fabric such that the tape covers the seam line. After the tape is attached, the entire rubber shell--fabric piece--rubber tape assembly is placed in a mold to melt and cure the rubber tape. A particular problem associated with this procedure is that the edges of the top and bottom portions of the mold tend to engage and stick to the rubber tape, pulling a large portion of the tape off the seam line.

Accordingly, it would be highly desirable to provide an improved dog's toy which can be thrown a long distance to bounce in an erratic pattern liked by dogs while producing only a small risk that the toy will injure a dog. It would also be highly desirable to provide an improved method for molding a dog's toy to minimize the quantity of rubber tape pulled off the seam line of the toy during molding of the toy to soften and cure the rubber tape.

Therefore, it is a principal object of the instant invention to provide an improved toy.

A further object of the invention is to provide an improved animal toy which reduces the risk that the toy will, when thrown, injure an animal chasing the toy.

Another object of the invention is to provide an improved animal toy which elastically compresses and bends to minimize the risk of injury to an animal.

Still another object of the invention is to provide an improved method of producing an animal toy which reduces the likelihood that polymer seam tape will significantly damaged during molding.

These and other, further and more specific objects and advantages of the invention will be apparent to those skilled in the art from the following detailed description thereof, taken in conjunction with the drawings, in which.

Figure 6:
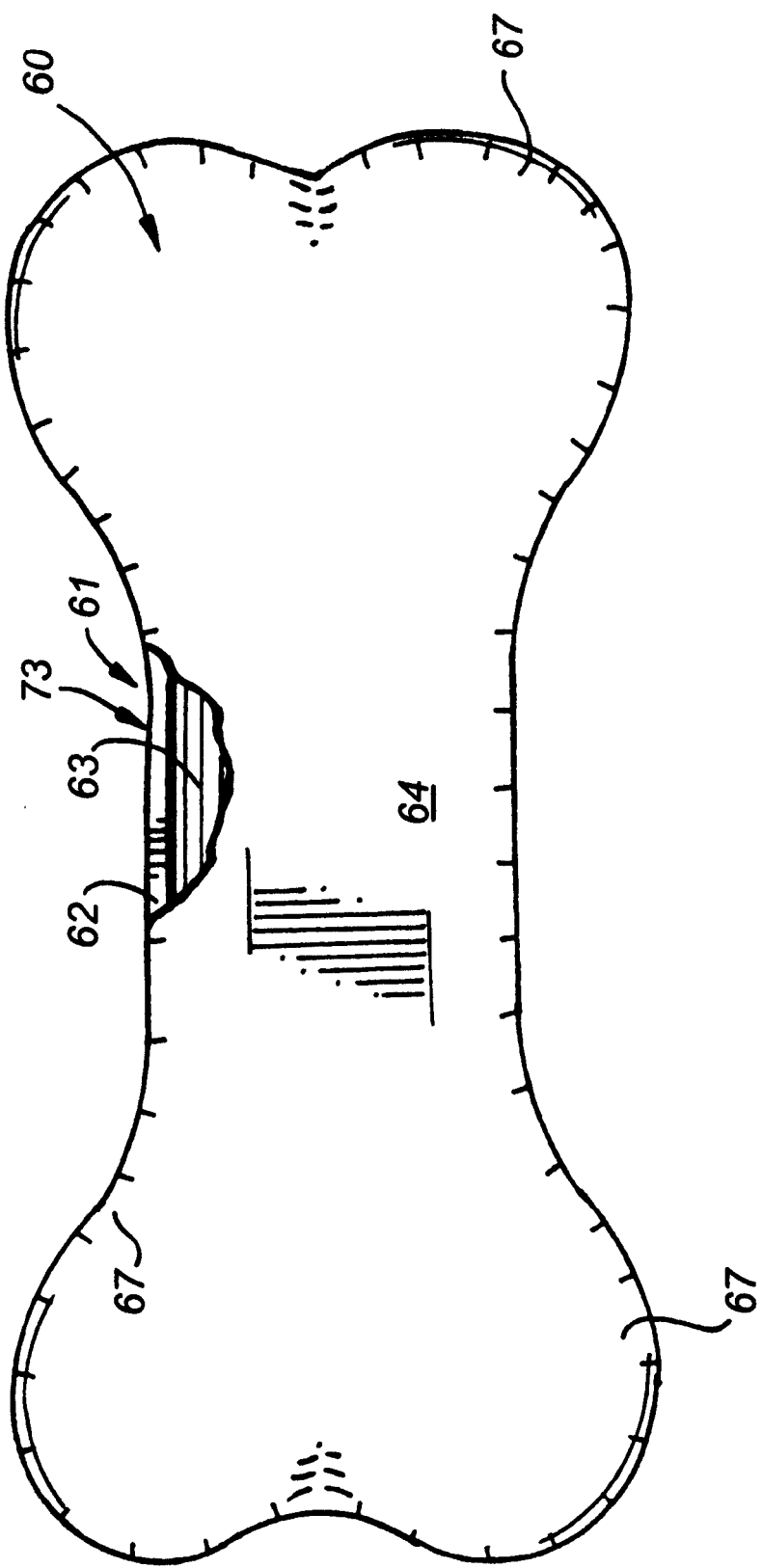
FIG. 6 is a top view of the top and bottom halves used in forming a toy in accordance with the method of FIG. 5.
Figure 7:
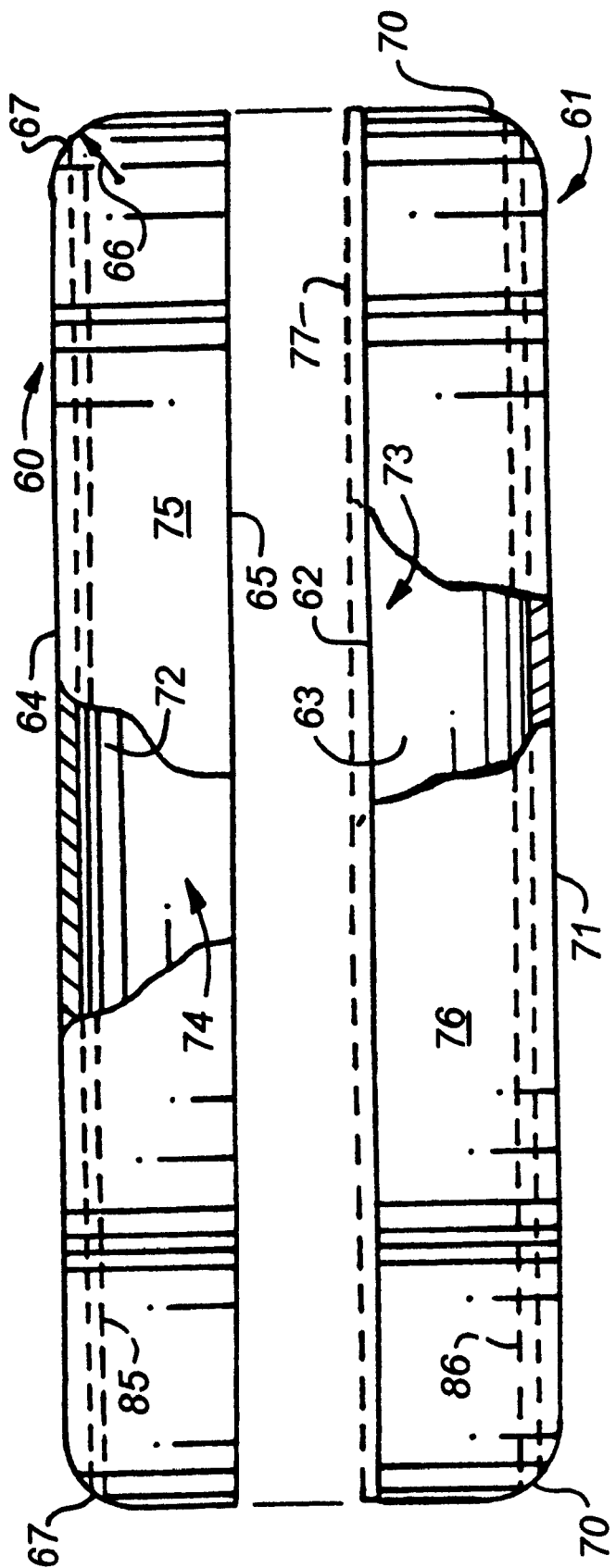
FIG. 7 is a side elevation assembly view of the top and bottom halves of FIG. 6 further indicating where adhesive is applied to affix the top and bottom halves to one another to form a seam line.
Figure 8:
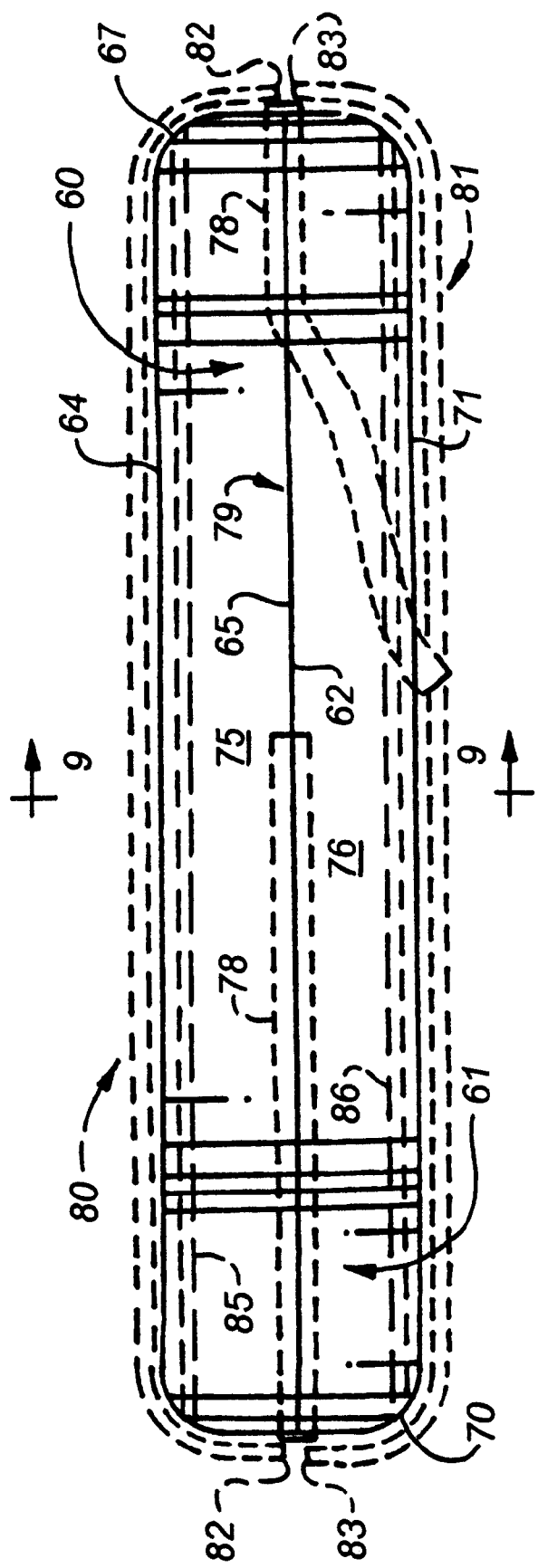
Figure 9:
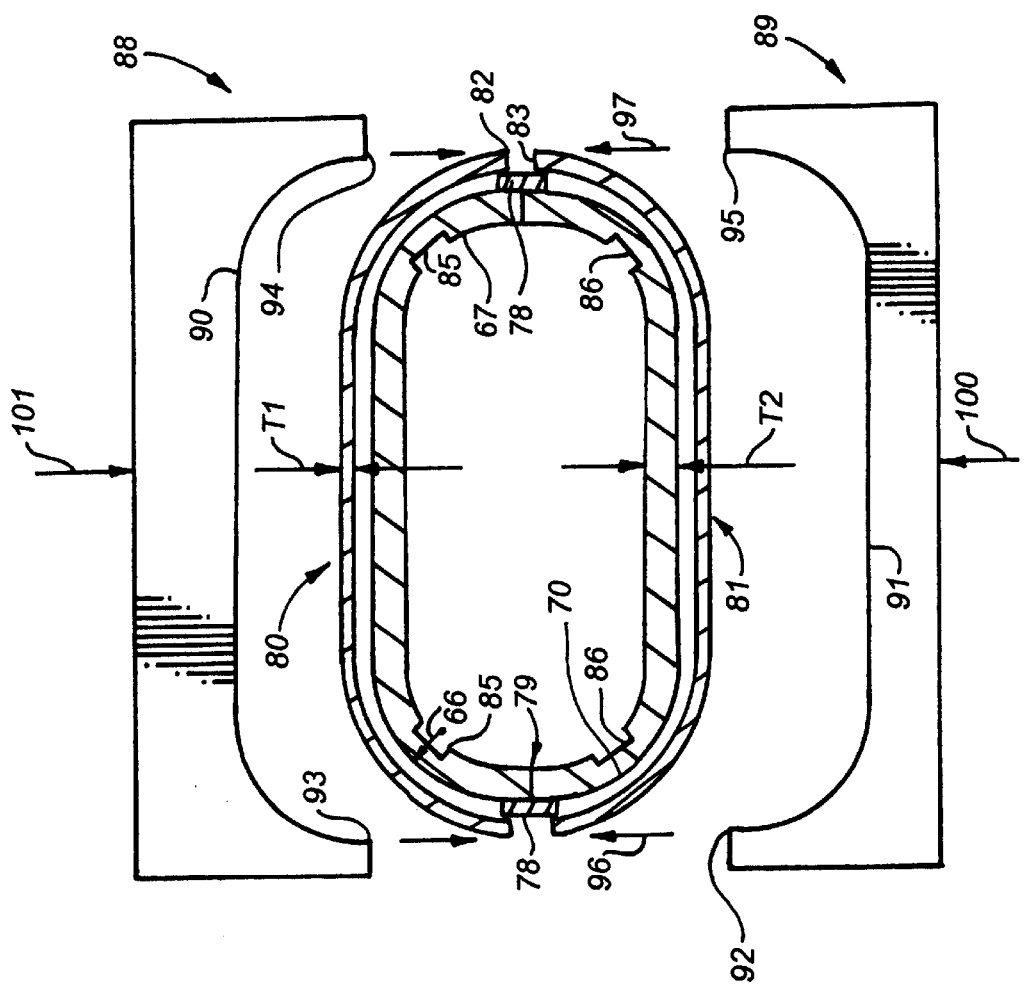

FIG. 8 is a side elevation view illustrating the top and bottom halves of FIGS. 6 and 7 after assembly, and indicating application of polymer tape along the seam line and of felt covers overlapping the polymer tape to produce a moldable member; and, FIG. 9 is a section view of the moldable member of FIG. 8 taken along section lines 9—9 thereof and illustrating the molding of the moldable member to draw together the edges of the felt covers and to soften and cure the polymer tape.

Briefly, in accordance with the invention, I provide an improved animal toy. The toy includes a compressibly elastically deformable hollow thin-walled rubber core sealingly circumscribing and enclosing a selected compressible gaseous volume. The rubber core includes a center, an outer surface, a wall less than about three-sixteenths of an inch thick, and points on the outer surface at varying distances from the center. A felt cover is affixed to the outer surface of the core. At least one elongate strip of material extends over the outer surface as a line of demarcation to separate the felt cover into at a least two areas, one on either side of the strip of material.

In another embodiment of the invention, I provide an improved animal toy. The toy includes a compressibly elastically deformable hollow thin-walled rubber core sealingly circumscribing and enclosing a selected compressible gaseous volume. The rubber core includes a center; an outer surface; a wall less than about three-sixteenths of an inch thick; points on the outer surface at varying distances from the center; and, an inner wall portion circumscribing an aperture extending completely through the core. A felt cover is affixed to the outer surface of the core.

In a further embodiment of the invention, I provide an improved animal toy. The toy includes a compressibly elastically deformable thin-walled hollow symmetrical rubber core sealingly circumscribing and enclosing a selected compressible gaseous volume. The rubber core includes a center; an outer surface; a wall less than about three-sixteenths of an inch thick; and, points on the outer surface at varying distances from the center. A felt cover is affixed to the outer surface of the core. The symmetrical core is shaped and dimensioned such that the toy can be thrown to bounce along a straight line, and such that the direction of travel of the toy changes from bounce to bounce.

In still another embodiment of the invention, I provide an improved animal toy. The toy includes a compressibly, elastically deformable thin-walled hollow rubber core sealingly circumscribing and enclosing a selected compressible gaseous volume. The rubber core includes a center; an outer surface; a wall less than about three-sixteenths of an inch thick; points on the outer surface at varying distances from the center; and, an inner wall portion circumscribing an aperture extending completely through the core. The core is shaped and dimensioned such that the toy when thrown randomly bounces erratically. A felt cover is affixed to the outer surface of the core. A length of rope extends through the aperture such that the rope can be grasped to throw the toy.

In yet another embodiment of the invention, I provide an improved animal toy. The toy includes a compressibly, elastically deformable thin-walled hollow rubber core sealingly circumscribing and enclosing a selected compressible gaseous volume. The rubber core includes a center; an outer surface; a wall less than about three-sixteenths of an inch thick; and, points on the outer surface at varying distances from the center. The core is shaped and dimensioned such that the toy when thrown randomly will bounce erratically. A felt cover is affixed to the outer surface of the core and includes a plurality of fibers forming a soft compressible layer adjacent the outer surface.

In still yet another embodiment of the invention, I provide an improved animal toy. The toy includes an elongate compressibly, elastically deformable bendable thin-walled hollow rubber core sealingly circumscribing and enclosing a selected compressible gaseous volume. The core includes a center; an outer surface; a wall less than about three-sixteenths of an inch thick; and, points on the outer surface at varying distances from the center. The core is shaped and dimensioned such that the toy when thrown randomly will bounce erratically. A felt cover is affixed to the outer surface of the core and includes a plurality of fibers forming a soft compressible layer adjacent the outer surface.

In a further embodiment of the invention, I provide an improved animal toy. The improved animal toy includes a compressibly elastically deformable hollow thin-walled rubber core sealingly circumscribing and enclosing a selected compressible gaseous volume and including a center, an outer surface, a wall less than about four millimeters thick, and points on the outer surface at varying distances from the center; includes a felt cover affixed to the outer surface of the core and having a selected thickness, the ratio of the thickness of said felt cover to the thickness of said wall being in the range of 1:2 to 1:1; and, includes at least one elongate strip of material extending over the outer surface as a line of demarcation to separate the felt cover into at least two areas, one on either side of the strip of material.

In another embodiment of the invention, I provide an improved animal toy. The improved toy includes a compressibly elastically deformable hollow thin-walled rubber core sealingly circumscribing and enclosing a selected compressible gaseous volume and including a center; an outer surface, a wall less than about three-sixteenths of an inch thick; points on the outer surface at varying distances from the center; and, at least one arcuate outer edge generally having a radius of at least three-quarters of an inch; and, a felt cover affixed to the outer surface of the core. The felt cover has a thickness greater than about two millimeters.

In still a further embodiment of the invention, I provide an improved animal toy. The improved animal toy includes a compressibly elastically deformable thin-walled hollow symmetrical rubber core sealingly circumscribing and enclosing a selected compressible gaseous volume and including a center, an outer surface, a wall less than about three-sixteenths of an inch thick, and points on the outer surface at varying distances from the center. The improved toy also includes at least one arcuate edge including an area of weakness which reduces the force required to deform the edge; and, a felt cover affixed to the outer surface of the core.

In yet another embodiment of the invention, I provide an improved method for producing an animal toy. The improved method includes the steps of forming the top half of the toy; forming the bottom half of the toy; fastening together the top half and the bottom half along a seam line to form a unitary member; applying polymer tape along the seam line; applying a felt cover to the top half such that at least a portion of the edge of the cover overlaps the polymer tape; applying a felt cover to the bottom half such that at least a portion of the edge of the cover overlaps the polymer tape, the unitary member, polymer tape and felt covers collectively forming a moldable member; and, molding the moldable member to soften and cure the polymer tape and to draw together the edges of the felt covers.

Figure 1:
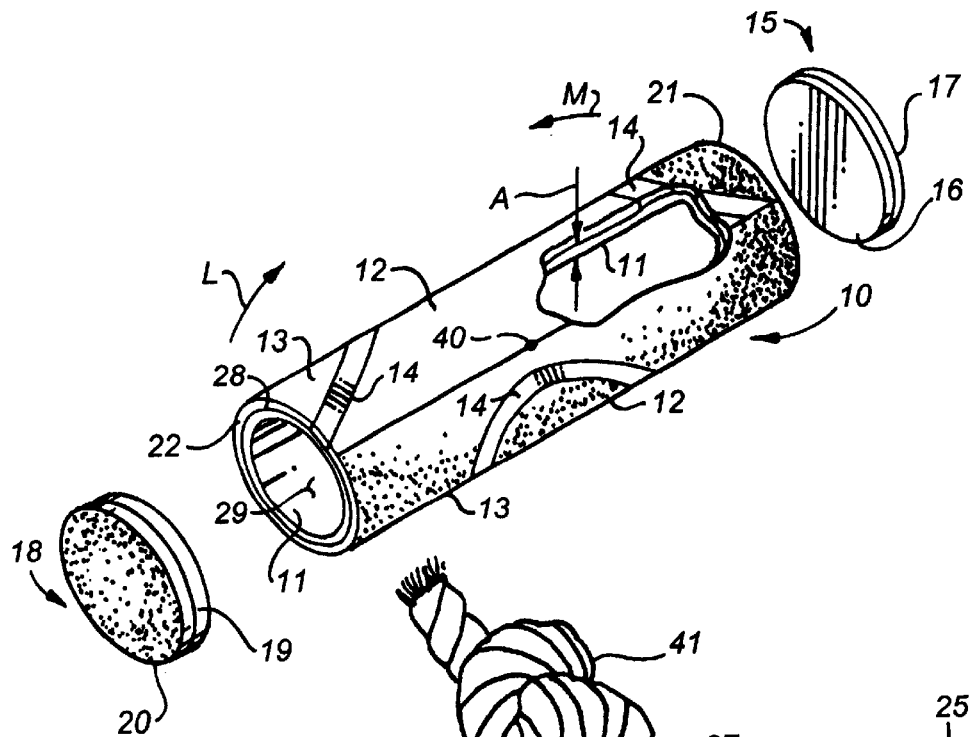
FIG. 1 is a perspective view of a hollow elastic fabric-covered toy constructed in accordance with the principles of the invention.

Turning now to the drawings, which describe the presently preferred embodiments of the invention for the purpose of illustrating the practice thereof and not by way of limitation of the scope of the invention, and in which like characters refer to corresponding elements throughout the several views, FIG. 1 illustrates a toy including a hollow cylindrical rubber core 11. If desired, supporting walls can be formed inside of hollow core 11 much like bulkheads are formed inside the hollow hull of a ship. Pieces 12, 13 of felt or another desired fabric are adhesively secured or otherwise affixed to the outer cylindrical surface 28 of core 11. Fabric pieces 12, 13 are shaped and dimensioned and applied to surface 28 such that a space or groove of substantially constant width between the pieces 12, 13 is formed. This track is filled with an elastic rubber material to form strip 14. Alternatively, one or more fabric pieces can be utilizes to complete cover surface 28, after which a strip 14 of material can be attached on or in the fabric to form a strip 14 dividing the fabric into sections on either side of the strip 14. Strip 14 presently has a width in the range of one-sixteenth to seven-sixteenths of an inch, preferably two-sixteenths to five-sixteenths of an inch.

Cylindrical end piece 18 includes rubber piece 19 and fabric piece 20 adhesively secured or otherwise secured to piece 19. End piece 18 is secured to circular end surface or lip 22.

Cylindrical end piece 15 includes rubber piece 16 and fabric piece 17 adhesively secured or otherwise secured to piece 17. End piece 15 is secured to circular end surface or lip 21.

After end pieces 15 and 18 are secured to the ends of core 11, rubber pieces 19 and 16 and core 11 circumscribe and seal closed cylindrical volume 29.

The fabric used to cover surface 28 is presently preferably felt because felt provides a soft surface which reduces the strength of a blow to an animal when the toy inadvertently strikes an animal. Felt also resiliently compresses to absorb some of the force of the blow. While any felt can be utilized, the preferred felt comprises a firm woven cloth of wool or cotton heavily napped and shrunk to form a smooth resilient texture.

The core 11 of the toy of the invention must be fabricated from rubber because core 11 must be able to be elastically compressed. As used herein, the term rubber includes natural or synthetic rubbers and polymers or other components which produce materials having the properties of a rubber.

Since the wall of hollow core 11 must have "give", it is important in the practice of the invention that the wall be relatively thin. The thickness, indicated by arrows A in FIG. 1, of the wall of core 11 is in the range of about one-sixteenth of an inch to five-sixteenths of an inch, preferably one-sixteenth of an inch to three-sixteenths of an inch.

At the same time, the rubber utilized to make core 11 must be relatively tough so that a dog or other animal cannot with its teeth readily puncture core 11.

Another important feature of the toy of the invention is that core 11 must sealingly circumscribe a gaseous volume 29. Volume 29 ordinarily is filled with air, but nitrogen or any other desired gas can be utilized. It is acceptable for the gas to have some moisture content; however, filling volume 29 with a fluid is not presently preferred because the fluid can add substantial weight to the toy and because the fluid does not compress as readily as a gas. After core 11 and end pieces 15 and 18 are assembled and sealingly enclose volume 29, additional gas can, if desired, be added to volume 29 to pressurize volume 29. Any desired method can be utilized to pressurize volume 29. For example, a composition can be put into volume 29 during manufacture. After member 11 and pieces 15 and 18 are assembled to sealingly enclose volume 29 and enclose the composition in volume 29, the assembled unit is heated to cause the composition to release gas to pressurize volume 29.

Pressurizing volume 29 is preferred because the pressure helps to support the wall of core 11 while still not preventing the wall of core 11 from being elastically compressed.

The center point 40 of the toy of FIG. 1 is circumscribed by and spaced apart from the cylindrical wall of core 11. Point 40 is also equidistant from each end piece 15, 18. The center point of a toy constructed in accordance with the invention is generally at an average distance from points, lines, or angle on the exterior of the toy. It is important that each toy include points on its exterior which are not equidistant from the center point of the toy. This construction insures that the toy will have the ability to bounce erratically. A toy with all surface points equidistant from the center of the toy is not utilized in the practice of the invention.

As earlier noted, elastic core 11 can be compressed, i.e., the cylindrical wall of core 11 can be elastically pushed inwardly. Another important feature which can be incorporated into toys constructed in accordance with the invention is that they can be bent. In FIG. 1 for example, after the toy is assembled, end piece 18 can be moved in the direction of arrow L simultaneously with the movement of end 15 in the direction of arrow M. When an object is bent, part of the object is subject to tensile forces while another opposed part of the object is subjected to compressive forces.

Figure 2:
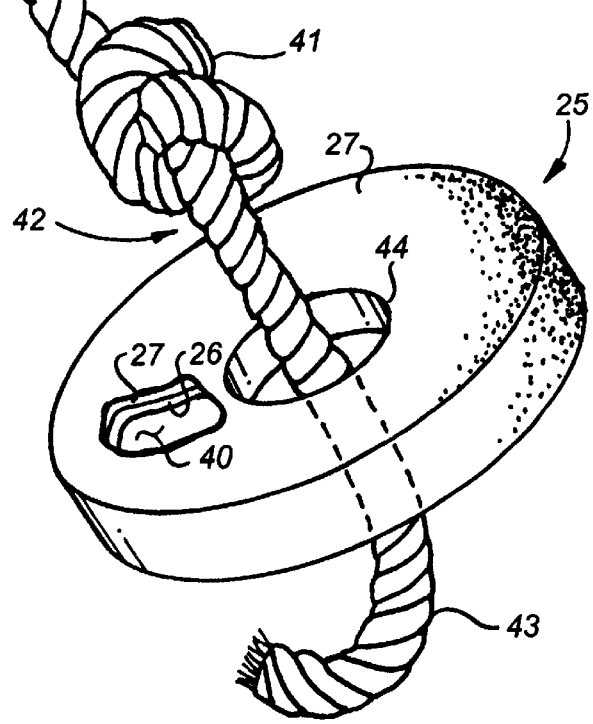
FIG. 2 is a perspective view of another hollow elastic fabric-covered toy constructed in accordance with the principles of the invention.

The hollow toy 25 illustrated in FIG. 2 includes a doughnut-shaped rubber core 26 which sealingly encloses gas-filled volume 40. Felt cloth 27 or other fabric substantially completely covers the outer surface of core 26 in the same manner that cloth pieces 12 and 13 cover substantially the entire outer surface 28 of the toy shown in FIG. 1. Cylindrical aperture 44 extends completely through toy 25. Knot 41 formed in rope 42 does not fit through aperture 25, which permits end 43 to be grasped manually so that the rope 42 and toy 25 can be twirled and thrown.

Figure 3:
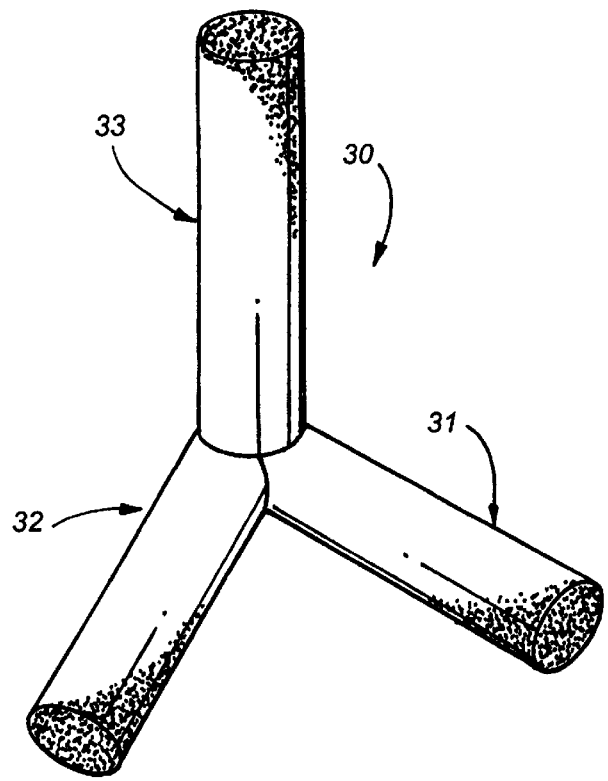
FIG. 3 is a perspective view of still another hollow, elastic fabric-covered toy constructed in accordance with the principles of the invention.

The toy 30 illustrated in FIG. 3 includes three hollow cylindrical legs 31, 32, 33 which co-terminate to form a three-legged toy. While the angles between legs can vary and the number of legs in the toy can vary, it is presently preferred that the legs 31 to 33 be normal to each other.

Figure 4:
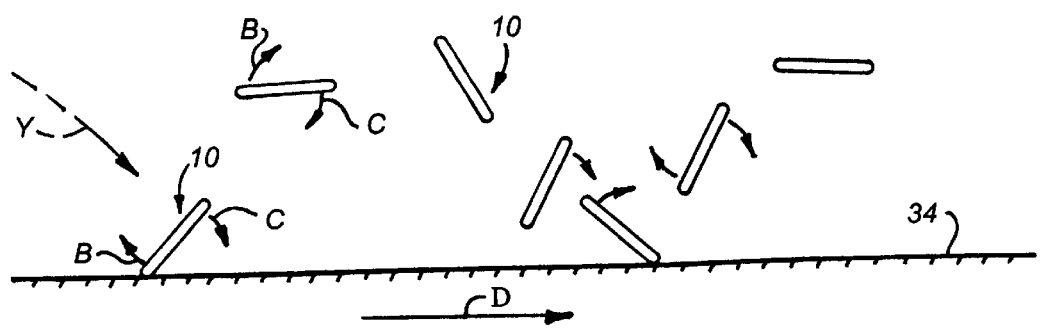
FIG. 4 is a side elevation view of the toy of FIG. 1 bouncing end-over-end in a constant fixed direction after being thrown and landing on the ground.

As used herein, when a toy is thrown "randomly", the toy is thrown without any attempt to control the orientation of the toy in the air. When the toys illustrated in FIGS. 1 to 3 are thrown randomly, it is highly likely that they will bounce erratically when they hit the ground. It is possible, however, for each toy to be thrown so it will not bounce erratically. For example, as shown in FIG. 4, the toy in FIG. 1 can be thrown end-over-end toward the ground in the direction of arrow Y, hit the ground, and continue to travel in the direction of arrow D. This does not constitute an erratic bounce because after the toy hits the ground it continues to travel in the same direction D.

Similarly, it is possible to throw the toy of FIG. 2 like a frisbee, such that the toy 25 hits or lands on the ground flat on one of its two opposed circular faces and stops dead. This does not constitute an erratic bounce because the toy 25 does not bounce. Throwing the toy to accomplish such a landing is difficult at best. Alternately, toy 25 can be thrown in a vertical orientation which causes it to land on edge on the ground and roll in a straight line. This is difficult to accomplish on a consistent basis, especially if rope 42 is still in the toy 25 when it lands. To insure that rope 42 stays in the toy, a knot can also be formed in end 43 which will not pass through aperture 44.

Throwing toy 30 of FIG. 3 so that it will not bounce erratically is difficult. It is possible to throw toy 30 so that it will make a three-point landing with the distal end of each leg 31 to 33 hitting the ground simultaneously or almost simultaneously so that toy 30 hits the ground and stops dead. Such a three point landing is highly unlikely.

As used herein, a toy has an erratic bounce when, after it hits the ground, it moves in a direction different from the direction it was traveling just prior to hitting the ground.

One important reason why toys with an erratic bounce are critical in the practice of the invention is that when a toy makes an erratic bounce the speed of travel of the toy after the bounce appears less, sometimes significantly less, than if the toy continues in the same direction of travel after the toy bounces. Since a primary object of the invention is to minimize the risk of injury to an animal, it is imperative that a toy not continue going in the same direction like a freight train after it hits the ground, but that some of the inertia of the toy be consumed by insuring that the toy bounce erratically. The ability of the toy to be compressed and to be bent on contacting the ground also consumes some of the toy's inertia.

Figure 5:
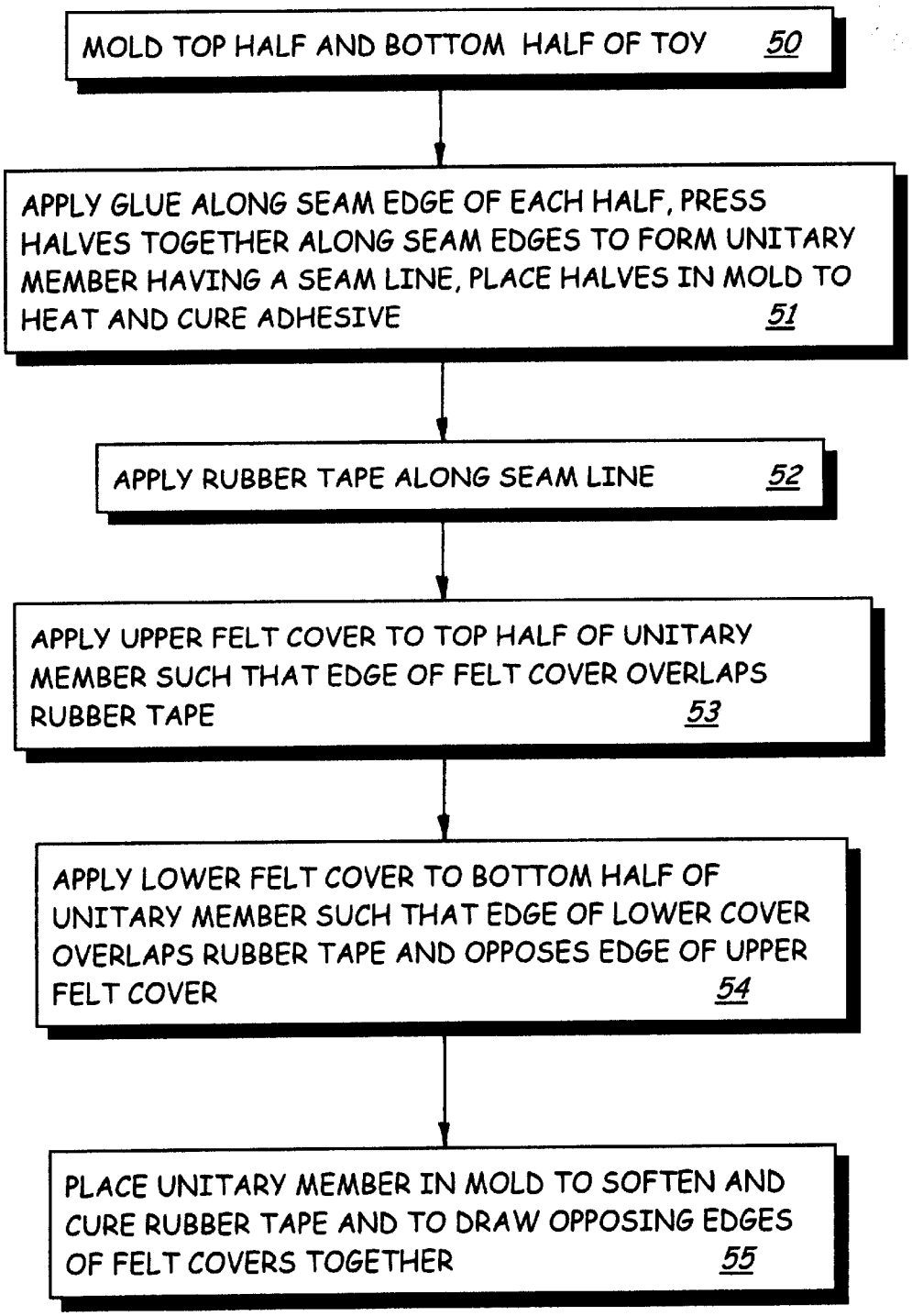
FIG. 5 is a block flow diagram illustrating a method for producing an. animal toy in accordance with the invention.

An improved method for producing an animal toy is depicted in FIG. 5. The method includes the step 50 of "mold top half and bottom half of toy". If desired, methods other than molding can be utilized in step 50 to form the top and bottom halves of a toy.

Step 51 comprises "apply glue along seam edge of each half, press halves together along seam edges to form unitary member having a seam line, place halves in mold to heat and cure adhesive". Fasteners or methods other than gluing can be utilized to fasten together the top and bottom halves along a seam line.

Step 52 comprises "apply rubber tape along seam line". The tape can consist of any polymer or other material which is softened (by heating or any other desired method) and then hardens and cures.

Step 53 comprises "apply upper felt cover to top half of unitary member such that edge of felt cover overlaps rubber tape".

Step 54 comprises "apply lower felt cover to bottom half of unitary member such that edge of lower cover overlaps rubber tape and opposes edge of upper felt cover".

Step 55 comprises "place unitary member in mold to soften and cure rubber tape and to draw opposing edges of felt covers together".

Additional features of the invention, along with the method of FIG. 5, are further illustrated in FIGS. 6 to 9. The toy illustrated in FIGS. 6 to 9 has the shape of a dog bone, but the shape and dimension of toys made in accordance with the invention can vary as desired.

Symmetrical hollow opposing halves 60 and 61 are illustrated in FIG. 6. Each half 60 and 61 is presently preferably molded from a rubber or polymer compound which, after being molded and cooled to ambient temperature (76 degrees F) is bendable and resilient. The material and method utilized to manufacture each half can vary as desired.

Half 60 includes generally flat upper area 64, front side 75, back side 74, inner surface 72, and edge 65. Arcuate edge 67 extends around half 60. Half 61 includes generally flat lower area 71, front side 76, back side 73, inner surface 63, and edge 62. Arcuate edge 70 extends around half 61. Edge 62 opposes and has a shape, contour and dimension equivalent to the shape and dimension of edge 65.

Line of weakening or groove 85 extends along the inside of arcuate edge 67. Line of weakening or groove 86 extends along the inside of arcuate edge 70. Lines of weakening 85, 86 are important in the practice of one embodiment of the invention because they function to require less pressure be applied to deform edges 67 and 70, respectively, (and the felt covering edges 67 and 70) inwardly or outwardly. When less force or pressure is required to deform edges 67 and 70, it is less likely that edges 67 and 70 will cause injury when a toy constructed in accordance with the invention strikes an animal or human being. The lines of weakening can be formed in any desired manner. For example, instead of grooves 85, 86, perforations can be formed through edges 67 and 70 to remove material from and weaken edges 67 and 70. The lines of weakening can be formed on the inside of arcuate edges 67 and 70, on the outside of arcuate edges 67 and 70, through edges 67 and 70, etc.

The radius of curvature 66 of edges 67 and 70 can vary as desired. The radius of curvature of the edges of a toy which are on the outer surface of a toy and can contact the body of an animal or human being is, however, preferably ¾ of an inch or greater. A larger radius of curvature makes it less likely that an edge 67, 70 will penetrate and injure an eye or other part of the body of an animal or human being.

FIG. 7 also illustrates the top 60 and bottom 61 halves. In addition, dashed lines 77 in FIG. 7 illustrate adhesive which is placed on edge 62, and if desired on edge 65, to glue together halves 60 and 61 to form the seam line 79 illustrated in FIG. 8. After halves 60 and 61 are glued or otherwise fastened together, a strip of polymer or rubber is wrapped around and covers seam line 79. The polymer strip is indicated by dashed line 78 in FIG. 8. The polymer strip 78 can be sticky and adhere by itself to tops 60 and 61. Or, adhesive can be utilized to adhere strip 78 to tops 60 and 61. Or, some of the adhesive used to adhere the halves 60 and 61 may ooze out from seam line 79 and be used to adhere strip 78 to halves 60 and 61 over seam line 79.

Once strip 78 is fastened over seam line 79, a felt cover, indicated by dashed line 80 in FIG. 8 is placed over half 60 such that edge 82 overlaps strip 78. A felt cover, indicated by dashed line 81 in FIG. 8 is placed over half 61 such that edge 83 overlaps strip 78. Edges 82 and 83 are spaced apart as shown in FIG. 8. An adhesive (not shown) can be applied to covers 80, 81 or to halves 60, 61 to facilitate the adhering of the covers 80, 81 to the halves 60, 61.

Once the strip 78 and covers 80 and 81 are applied, the halves 60 and 61 are placed in a mold 88, 89. One or more mold parts 88 and 89 are moved to compress halves 60, 61 and covers 80, 81 in the directions indicated by arrows 100 and 101. Mold edges 92 to 95 engage edges 82 and 83 to stretch edges 82 and 83 toward one another in the directions indicated by arrows 96 and 97 in FIG. 9. Mold 88, 89 heats, softens, and cures the polymer or rubber in strip 78. Mold edges 92 to 95 also compress edges 82, 83 inwardly against strip 78 to facilitate the adhering of edges 92 and 95 to strip 78 when strip 78 softens. The mold 88, 89 also heats felt covers 80 and 81 to facilitate adherence of the covers 80 and 81 to halves 60 and 61.

The thickness, indicated by arrows T1, of the wall of halves 60 and 61 with respect to the thickness, indicated by arrows T2, of the felt covers 80, 81 is important in one embodiment of the invention. Many dog toys utilize heavy, thick, relatively hard rubber, probably with the intent of making it difficult for a dog to chew up the toy. Such rubber can, however, turn the toy into a dangerous projectile when the toy is thrown. I have discovered that utilizing a felt cover with a thickness in the range of 2.0 millimeters to 6.0 millimeters, preferably 2.4 mm. to 4.0 mm., in combination with a resilient, pliable rubber or polymer material having a thickness in the range of only 2.0 mm to 4.0 mm produces a laminate having good "chew resistance" and having the additional feature of being quite safe because the thin, resilient polymer material is readily deformed and is not hard and because the thick felt tends to dissipate the forces produced when a dog or other animal bites the toy. Accordingly, the ratio of the thickness of the felt covers 80, 81 to the thickness of polymer material comprising halves 60 and 61 is in the range of 1:3 to 1.5:1, preferably 1:2 to 1:1.

Having set forth the presently preferred embodiments of my invention in such terms as to enable those skilled in the art to make and use the invention, I claim:

1. An animal toy, including
   (a) a compressibly elastically deformable hollow thin-walled rubber core sealingly circumscribing and enclosing a selected compressible gaseous volume and including a center, an outer surface, a wall less than about four millimeters thick, and points on the outer surface at varying distances from the center;
   (b) a felt cover affixed to said outer surface of said core and having a selected thickness, the ratio of the thickness of said felt cover to the thickness of said wall being in the range of 1:2 to 1:1; and,
   (c) at least one elongate strip of material extending over said outer surface as a line of demarcation to separate said felt cover into at a least two areas, one on either side of said strip of material.

2. A method for producing an animal toy, including the steps of
   (a) forming the top half of the toy;
   (b) forming the bottom half of the toy;
   (c) fastening together said top half and said bottom half along a seam line to form a unitary member;
   (d) applying polymer tape along said seam line;
   (e) applying a felt cover to said top half such that at least a portion of the edge of the cover overlaps said polymer tape;
   (f) applying a felt cover to said bottom half that at least a portion of the edge of the cover overlaps said polymer tape, said unitary member, polymer tape and felt covers collectively forming a moldable member; and,
   (g) molding said moldable member to soften and cure said polymer tape and to draw together said edges of said felt covers.

* * * * *